United States Patent
Stiles

[11] Patent Number: 6,071,370
[45] Date of Patent: Jun. 6, 2000

[54] FUEL TANK WITH INTEGRAL HEAT SHIELD

[75] Inventor: Ernest D. Stiles, St. Clair Shores, Mich.

[73] Assignee: Ford Global Technologies, Inc., Dearborn, Mich.

[21] Appl. No.: 08/172,773

[22] Filed: Dec. 27, 1993

[51] Int. Cl.⁷ .................................................. B29C 49/20
[52] U.S. Cl. .................. 156/285; 156/244.13; 264/515; 264/516; 264/529
[58] Field of Search ................................... 156/245, 285, 156/287, 244.13; 264/515, 516, 257, 529; 220/562, 563, 4.14, 468

[56] References Cited

U.S. PATENT DOCUMENTS

| | | | |
|---|---|---|---|
| 3,409,714 | 11/1968 | Strugar, Jr. .............................. | 264/242 |
| 3,526,694 | 9/1970 | Lemelson ................................. | 264/259 |
| 3,717,544 | 2/1973 | Valyl ....................................... | 161/252 |
| 3,801,402 | 4/1974 | Suter ....................................... | 156/182 |
| 3,827,130 | 8/1974 | Baumann ................................. | 29/421 |
| 4,174,245 | 11/1979 | Martineau ............................... | 156/245 |
| 4,405,557 | 9/1983 | Lehnard ................................... | 264/515 |
| 4,445,954 | 5/1984 | Adams et al. ........................... | 156/148 |
| 4,617,077 | 10/1986 | Giese et al. ............................. | 264/529 |
| 4,830,810 | 5/1989 | Ufer et al. ............................... | 264/529 |
| 4,942,008 | 7/1990 | Cahill ...................................... | 264/150 |
| 5,020,687 | 6/1991 | Seizert .................................... | 220/645 |
| 5,129,544 | 7/1992 | Jacobson et al. ....................... | 220/562 |
| 5,186,875 | 2/1993 | Fukuhara ................................. | 264/37 |
| 5,188,981 | 2/1993 | Stiles et al. ............................. | 428/195 |
| 5,244,615 | 9/1993 | Hobbs ..................................... | 264/529 |
| 5,344,038 | 9/1994 | Freeman et al. ........................ | 220/562 |

FOREIGN PATENT DOCUMENTS

| | | | |
|---|---|---|---|
| 178724 | 11/1982 | Japan ....................................... | 264/515 |
| 178725 | 11/1982 | Japan ....................................... | 264/515 |
| 71129 | 4/1983 | Japan ....................................... | 264/515 |
| 81221 | 5/1984 | Japan ....................................... | 264/515 |

*Primary Examiner*—Geoffrey L. Knable
*Attorney, Agent, or Firm*—Damian Porcari

[57] ABSTRACT

A fuel tank having an integrally molded heat shield. An insulating material is secured to one surface of a pad made from foamed high density polyethylene (PE). The heat shield is placed within a blow-molding apparatus. A hot pliable HDPE parison is extruded adjacent a second surface of the pad. The parison contacts the second surface and causes the second surface to heat and partially melt. The parison is urged against the pad. HDPE material from the pad and parison intermingle and fuse. Pressure from the blow molding process aids in intermingling the molten surfaces together to form a strong integral attachment.

1 Claim, 2 Drawing Sheets

FUEL TANK WITH INTEGRAL HEAT SHIELD

FIELD OF THE INVENTION

The present invention relates to a blow-molded plastic fuel tank with an integral heat shield and a method of making the same.

BACKGROUND OF THE INVENTION

Plastic fuel tanks are commonly used in automobiles because of their strength, formability, weight and cost. One requirement of all automotive fuel tanks is the ability to withstand exposure to the high temperatures that may be encountered under a vehicle. Current plastic automotive fuel tanks are made from high density polyethylene (HDPE). HDPE has a glass transition temperature of LESS THAN 300° F. This is normally sufficient for most automotive applications. However, some applications require that the fuel tank withstand exposure to higher temperatures.

When the fuel tank is placed near an exhaust manifold or catalytic converter, it must generally be shielded from higher temperatures. Current methods of shielding plastic fuel tanks include attaching fasteners to sockets formed in the tank as illustrating in U.S. Pat. No. 5,067,575. Mechanical fasteners are currently the preferred choice for attaching heat shields to plastic tanks because HDPE is not retentive to adhesives.

It is also know to manufacture blow-molded fuel tanks with a fabric outer layer for additional strength as taught in U.S. Pat. Nos. 5,020,687 and 5,194,212. These patents teach placing a mat of nylon or glass fibers within the interior of a mold. A parison is extruded adjacent the mat and inflated. The pliable parison penetrates the strands of the mat and secures the mat to the exterior of the tank. Plastic or liquid resin impregnates the mat to fasten it to the tank. The mat may provide some degree of temperature insulation.

Insert molded fiber reinforcement generally does not provide sufficient heat shielding for high temperature locations. Fuel tanks as exemplified by U.S. Pat. No. 5,020,687 generally require the parison to completely permeate the mat. The mat is usually made from compressed non-woven fibers. Lose or stray fibers may be easily shredded or torn from the mat. Impregnating the mat with the parison encases the fibers in plastic and prevents stray fibers from being torn. Impregnating the mat also significantly reduces its insulating properties. Air trapped within the mat provides it with insulating properties. The glass or nylon fibers are generally thermally conductive. When the mat is completed impregnated with plastic, it looses most of its insulating properties. Mats attached in this fashion retain little if any of their insulating properties.

Fuel tanks as exemplified in U.S. Pat. No. 5,194,212 similarly displace all of the air from the mat. High temperature resistant resin is used to give the fuel tank greater strength under exposure to high temperatures. Although this design can withstand the higher temperatures and remain structurally sound, it does not provide the insulating properties of the present invention. The resin impregnated mat become a thermal conductor. Heat is transferred through the mat and to the inner plastic wall and fuel within the tank.

SUMMARY OF THE INVENTION

The present invention overcomes these problems of the prior art by using a foam pad made from the same material as the fuel tank to secure an insulation material to the tank. The insulation resists the transfer of heat to the plastic tank wall and fuel within the tank. A head shield is formed by an insulation material is attached to one surface of the foam heat shield. The pad is placed within a blow-molding apparatus. A hot pliable parison is extruded adjacent a second surface of the pad. The parison contacts the second surface and causes the second surface to heat and partially melt. The parison is urged against the pad. Because the pad and parison are made from the same material, they intermingle and fuse. Pressure from the blow molding process aids in mingling the molten surfaces together to form a strong integral attachment. Most of the pad retains its foam character and thus provides insulating properties in addition to those of the insulation material.

The pad is attached to the insulation material by flame bonding, or welding. A variety of insulation material may be used. The insulation is selected based on the temperature requirement of the specific environment. Flame welding permits a high speed and low cost method of securing the pad to the insulation.

The heat shield is placed within the mold. It may be manually positioned or an automated arm can place it within the mold. The heat shield is retained on the interior surface of the mold by a locator. One form of the locator is a recess in the mold that holds the heat shield in place by compression. An alternative locator may be projections on the interior surface of the mold.

DETAIL DESCRIPTION OF THE PREFERRED EMBODIMENTS

Figure 1:
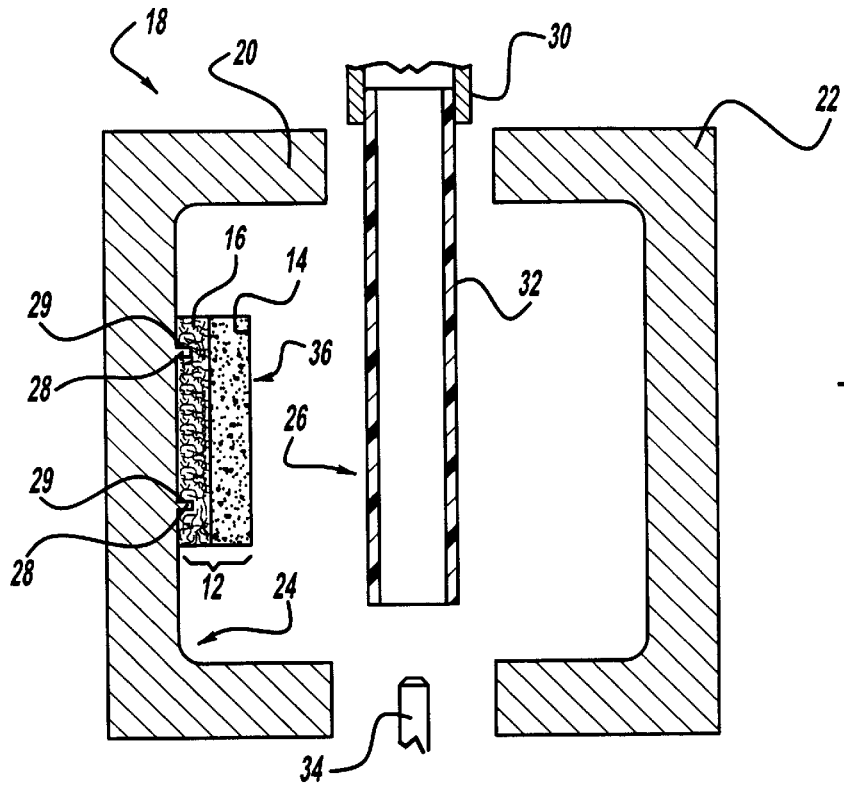
FIG. 1 shows a partial sectional view of a blow-molding apparatus.
Figure 2:
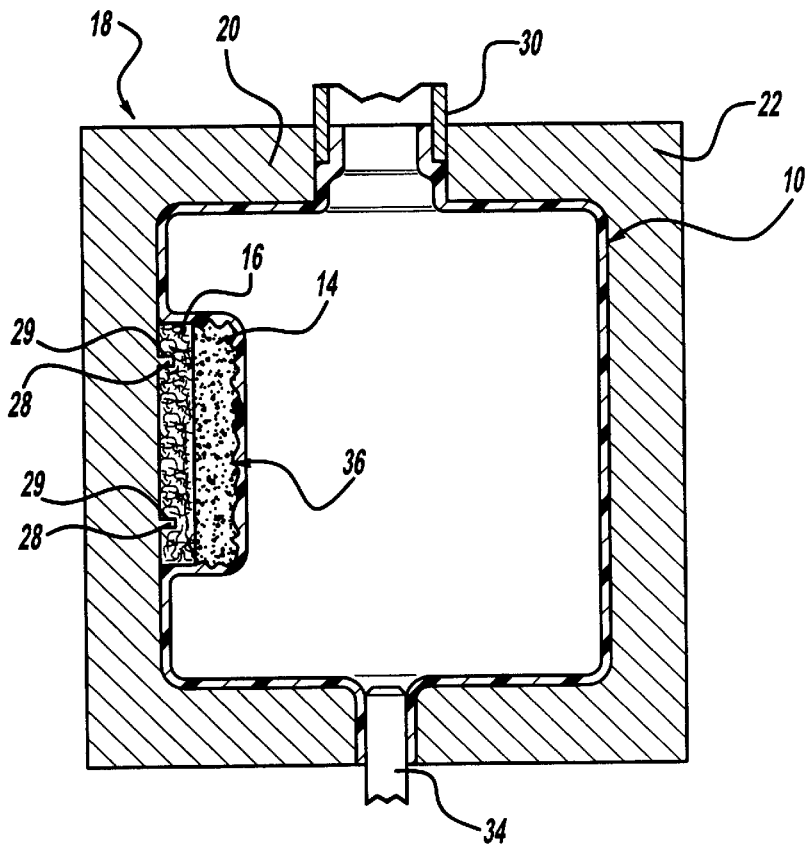
FIG. 2 shows the blow-molding apparatus shown in FIG. 1 after the parison is inflated.
Figure 3:
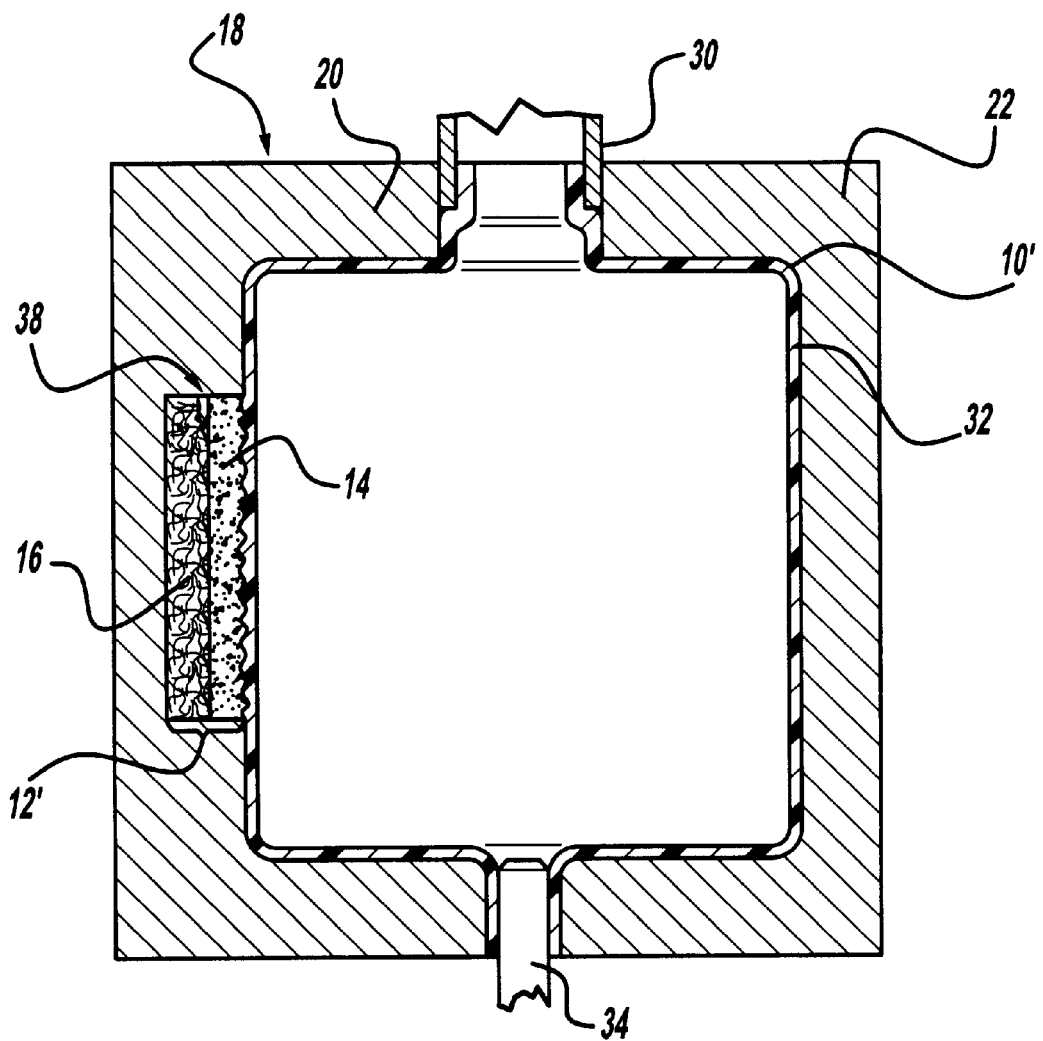
FIG. 3 shows a partial sectional view of an alternative blow-molding apparatus.

The present invention teaches a method of making an automotive fuel tank 10 with an integrally molded heat shield 12. Illustrated is FIGS. 1–3 is a process for manufacturing fuel tank 10 of the present invention. Heat shield 12 comprises a foam pad 14 and heat insulation material 16. A pad 14 of foamed polyethylene (PE) is prepared. Pad 14 can have a thickness of about ⅛ inch to ½ inch and a density of 2 to 9 lbs/ft³. The foam pad may be open or closed cell, and may be of crosslinked nature.

Pad 14 is generally formed into a coiled roll for ease of manufacture. Pad 14 is secured to a flat insulation material 16. Suitable insulation materials include fiberous or other textured materials. Commercial products include fiberous material from Biso Products and "Nomex" TM from ETS, Inc. Pad 14 may be secured to insulation material by a variety of methods, but most preferred is flame bonding.

Flame bonding involves exposing one surface of pad 14 to an open flame to heat and softens the PE material. While pad 14 surface is still tacky, insulation material 16 is pressed against pad 14 and is passed through a series of heated rollers. The insulation and pad are made from different and incompatible materials. The attachment between the pad and the insulation is primarily a mechanical attachment. The insulation is selected from either a closed cell or densely woven material that is tear resistant. Only a small portion of the molten pad material impregnates the insulation. The pad is heated locally to a very high temperature relative to the molding temperature. This high temperature softens the foam to a semi-liquid state. The semi-liquid foam impregnates the insulation backing.

The laminated heat shield is die cut into the desired shape for attachment to a fuel tank. Any alignment apertures may be cut into the heat shield at this time.

Heat shield 12 is placed inside a blow-molding apparatus 18. Illustrated in FIG. 1 is a partial sectional view of a blow-molding apparatus 18 for manufacturing automotive fuel tanks. Apparatus 18 is similar to those currently used commercially. Movable dies 20, 22 are operable between an open and closed position. FIG. 1 shows dies 20, 22 in the open position.

The interior surface 24 of die 20 is generally shaped to form the exterior surface 26 of a fuel tank 10. A locating means aligns and retains heat shield 12 on interior surface 24. One example of a locator means are upstanding projections 28. Projections 28 mate with apertures 29 in heat shield 12. The locating means serves to both align and retain heat shield in position against interior surface 24 during the molding operation. Heat shield may be manually placed on the locator means or an automated arm (not shown) may dispense heat shield atop projections 28. For additional retention, small barbs (not show) may be formed on projections 28. The barbs could serve to retain pad 20 without the need for apertures.

After heat shield is positioned within apparatus 18, extruder 30 heats a quantity of HDPE beyond its glass transition temperature of about 300° F. and dispenses a length of pliable parison 32. Parison 32 is commonly made from one or more layers of HDPE. When parison 32 is made with two or more layers of different materials, fuel tank 10 is configured so that exterior surface 26 is made from HDPE. Parison 32 remains hot and tacky for a short while. Dies 20 and 22 are moved to the closed position as shown in FIG. 2. The top and bottom of parison 32 are pinched and closed. The interior of parison 32 is inflated though blow pin 34. Generally two or more pins inflate the parison, but only one is shown for clarity. Blow pin 34 supplies pressurized gas to the interior of parison 32 and causes it to inflate. Inflating parison 32 takes the shape of interior surface 24 and contacts heat fusible surface 36 of pad 14. Parison 32 is still hot and tacky at this time. Parison 32 transfers heat to surface 36 thereby causing surface 36 to become tacky. Parison 32 is inflated to approximately 90 p.s.i. The combination of heat from parison 32 and the pressure of inflation causes molecules from parison 32 to migrate into pad 14 and vis-a-versa. This intermingling of materials causes pad 14 to fuse to parison 32 and become integral. A thin layer of material adjacent to both sides of surface 36 forms an interfacial region of blended materials. This region is primarily amorphuses and has a higher density. Some of the molecules diffuse from the foam into the tank at the interface to create an interdiffusion layer.

To further aid this intermingling of materials, the pressure within parison 32 may be alternatingly raised and lowered to form a type of pulsing. This pulsing is believe to further the intermingling process. It is known that the application of some pressure is necessary for the materials to blend and fuse.

After parison 32 has cooled for 30–60 seconds, fuel tank 10 is removed from apparatus 18 and left to cool. The cooled 10 parison functions as the fluid tight wall of fuel tank 10.

The final integrally molded tank has a substantially flush exterior surface. Parison 32 generally encircles pad 14. When insulation material 16 is selected from woven stock, the edge of insulation material 16 becomes incased within parison 32 and resistant to fraying. A large or small surface of fuel tank 10 may be protected with insulation material 16 in the manner described. Although not a primary purpose of the present invention, the laminated pad provides the tank with a margin of increased strength and protection from damage.

FIG. 3 illustrates an alternative embodiment of the present invention. In this alternative embodiment the locating means consists of a recessed area 38. Recess 38 is sized to receive heat shield 12'. Pad 14' is slightly larger than recess 38 and is retained within recess 38 through compression. Fuel tank 10' manufactured using this apparatus does not have a substantially flush exterior surface. Heat shield 12' extends beyond the exterior surface of the fuel tank wall and the perimeter of heat shield 12' is generally exposed.

Various modifications and adaptations of the present invention are possible without departing from the spirit and scope of the attached claims. These modifications and adaptations are included in the present inventions.

I claim:

1. A method of making a plastic fuel tank having an integrally molded heat shield comprising:

placing said heat shield against the interior surface of a mold, said heat shield having an insulating layer contacting said interior mold surface and a polyolefin foam pad having a heat fusible surface;

extruding a hot pliable parison within said mold;

inflating said parison and causing said parison to contact said heat fusible surface of said pad thereby causing said pad to become tacky; and pulsing by alternatingly raising and lowering the pressure within said parison to intermingle polyolefin from said pad and said parison to form an amorphous interdiffusion layer at the interface between said pad and said parison thereby fusing said pad to said parison to form said tank.

* * * * *